(12) United States Patent
Varekamp et al.

(10) Patent No.: US 7,382,899 B2
(45) Date of Patent: Jun. 3, 2008

(54) SYSTEM AND METHOD FOR SEGMENTING

(75) Inventors: Christiaan Varekamp, Eindhoven (NL); Matthijs Carolus Piek, Eindhoven (NL); Ralph Antonius Cornelius Braspenning, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 661 days.

(21) Appl. No.: 10/522,469

(22) PCT Filed: Jul. 11, 2003

(86) PCT No.: PCT/IB03/03185

§ 371 (c)(1),
(2), (4) Date: Jan. 26, 2005

(87) PCT Pub. No.: WO2004/013810

PCT Pub. Date: Feb. 12, 2004

(65) Prior Publication Data

US 2006/0078156 A1   Apr. 13, 2006

(30) Foreign Application Priority Data

Jul. 31, 2002   (EP) .................................. 02078116

(51) Int. Cl.
*G06K 9/00* (2006.01)

(52) U.S. Cl. .................. 382/107; 382/171; 382/173

(58) Field of Classification Search ............... 382/103, 382/107, 164, 171, 173, 177, 179, 236; 348/14.1, 348/154, 155, 413.1, 416.1, 451, 669, 699, 348/700; 375/240.01, 240.16, E7.1, E7.101, 375/E7.104, E7.106, E7.112, E7.113, E7.12, 375/E7.123, E7.163, E7.164

See application file for complete search history.

(56) References Cited

U.S. PATENT DOCUMENTS

| | | | | |
|---|---|---|---|---|
| 6,075,875 A | * | 6/2000 | Gu ............................ | 382/107 |
| 6,173,077 B1 | * | 1/2001 | Trew et al. ................. | 382/236 |
| 6,661,470 B1 | * | 12/2003 | Kawakami et al. ......... | 348/699 |

OTHER PUBLICATIONS

Gerard De Haan, et al: True-Motion Estimation with 3-D Recursive Search Block Matching, IEEE vol. 3 No. 5 Oct. 1993, pp. 368-379.
* cited by examiner

*Primary Examiner*—Abolfazl Tabatabai

(57) ABSTRACT

A segmentation system (100) for segmenting a first image feature (214) in a first video image from an adjacent second image feature (216) in the first video image on basis of motion and on an image property like color or luminance. The segmentation system (100) comprises; a block-based motion estimator (102) for estimating motion vectors (218-230) for blocks of pixels; a motion segmentation unit (104) for segmenting the first video image into a first group of connected blocks of pixels (204) and a second group of connected blocks of pixels (206) on basis of the motion vectors (218-230) of the respective blocks of pixels; and a pixel-based segmentation unit (106) for segmenting the first image feature (214) from the second image feature (214) by means of a pixel-based segmentation of a portion of the blocks of pixels of the first and second group of connected blocks of pixels (214 and 216), on basis of the respective values of the image property.

17 Claims, 7 Drawing Sheets

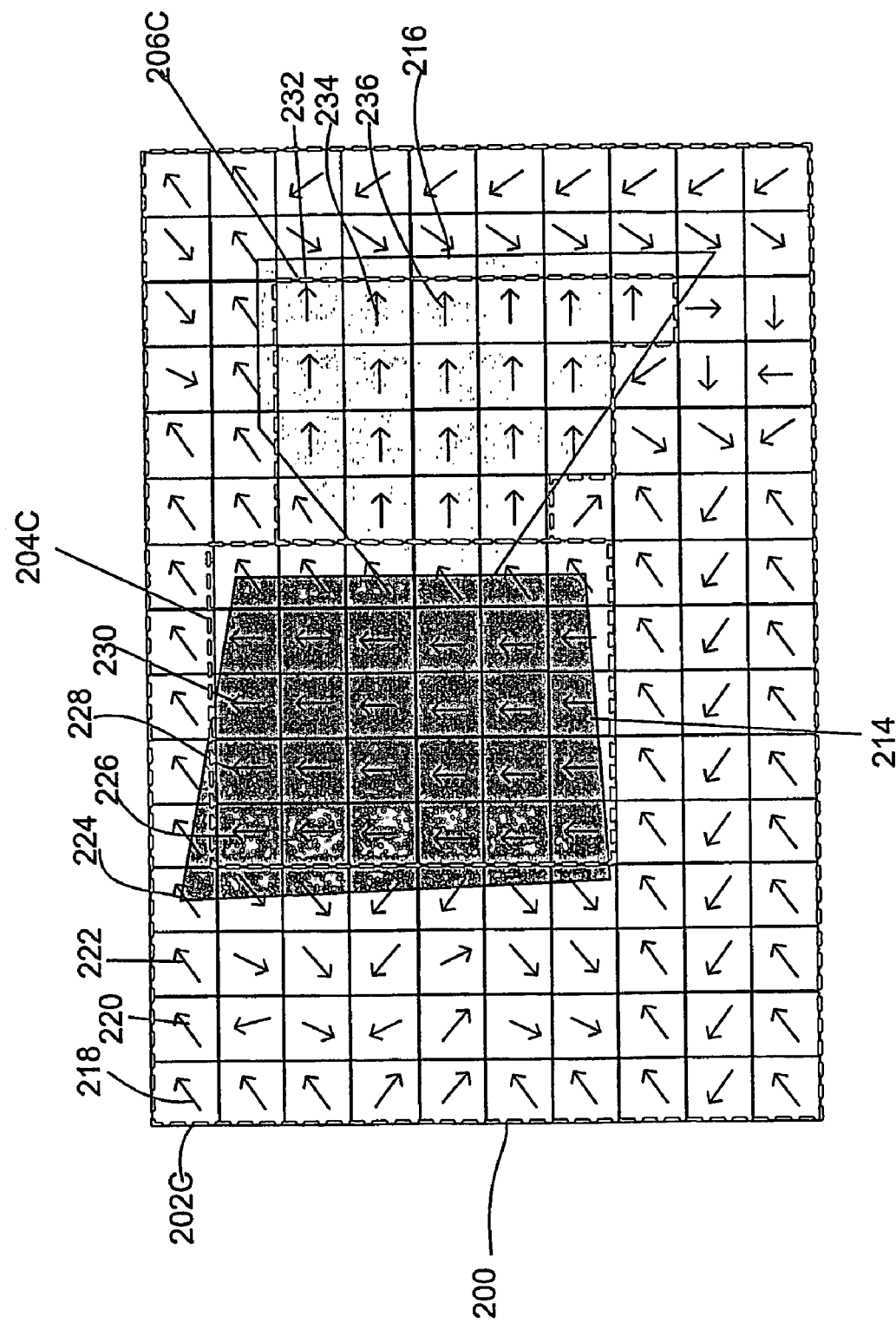

SYSTEM AND METHOD FOR SEGMENTING

Figure 1:
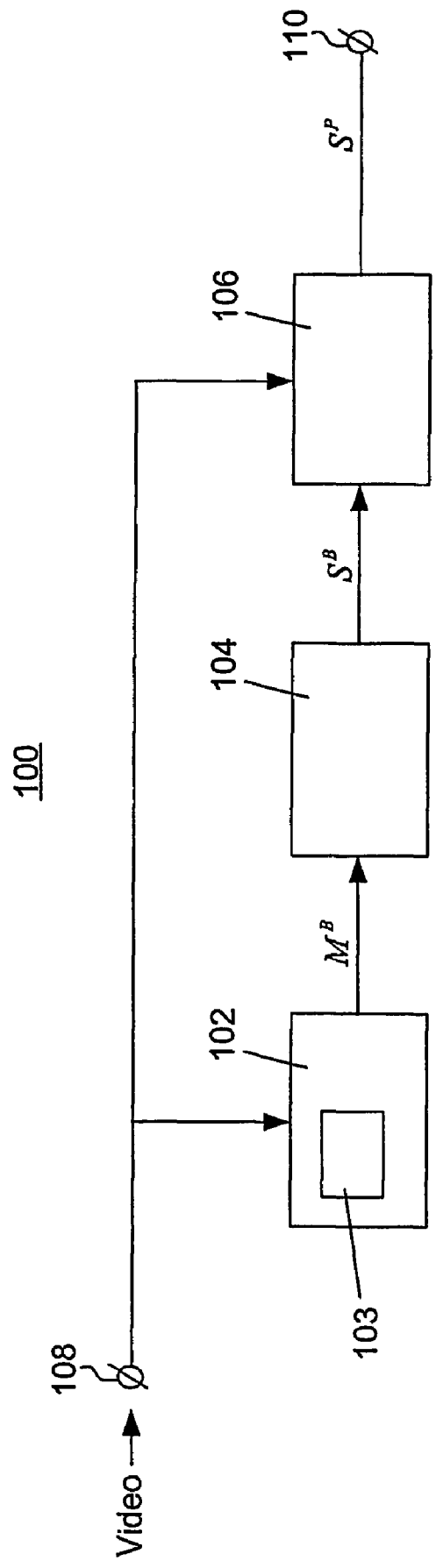

The invention relates to a method of segmenting a first image feature in a first video image from an adjacent second image feature in the first video image.

The invention further relates to a segmentation system for segmenting a first image feature in a first video image from an adjacent second image feature.

The invention further relates to a motion estimator at pixel resolution for estimating a motion vector field, comprising such a segmentation system.

The invention further relates to an image processing apparatus comprising:
- receiving means for receiving a signal representing a series of video images;
- such a motion estimator at pixel resolution for estimating a motion vector field from the video images; and
- a motion compensated image processing unit for determining processed images on basis of the video images and the motion vector field.

An embodiment of the method of the kind described in the opening paragraph is known from U.S. Pat. No. 6,075,875. This method includes obtaining a motion representation, e.g. motion vectors, of corresponding pixels in a selected video image and a preceding video image to form motion-segmented video image features. Video image features are also segmented according to their spatial image characteristics to form spatially-segmented video image features. Finally the video image features are jointly segmented as a weighted combination of the motion-segmented video image features and the spatially-segmented video image features. A disadvantage of the method according to the prior art is the relatively complex method of combining motion-segmented video image features and the spatially-segmented video image features. Notice that two different quantities, i.e. a motion based quantity and a spatial image characteristic, are weighted. Weighting different quantities is unusual.

It is an object of the invention to provide a method of the kind described in the opening paragraph which is pixel accurate and relatively easy.

This object of the invention is achieved in that the method of segmenting a first image feature in a first video image from an adjacent second image feature in the first video image, the first image feature having plural pixels with respective values of an image property substantially being in a first range of values and having motion relative to the second image feature between the first video image and a second video image, and the second image feature having plural pixels with respective values of the image property substantially being in a second range of values being different from the first range of values, comprises;
- dividing the first video image into blocks of pixels;
- estimating motion vectors for the respective blocks of pixels;
- segmenting the first video image into a first group of connected blocks of pixels and a second group of connected blocks of pixels by classifying the blocks of pixels on basis of the motion vectors of the respective blocks of pixels; and succeeded by
- segmenting the first image feature from the second image feature by means of a pixel-based segmentation of a portion of the blocks of pixels of the first and second group of connected blocks of pixels, which have been determined to be positioned at a border between the first and second group of connected blocks of pixels, on basis of the respective values of the image property.

An advantage of the method according to the invention is that the two segmentation operations are applied on the appropriate locations. The result of the block-based motion segmentation is used as input for the pixel-based segmentation on basis of the image property. The pixel-based segmentation is applied to recover object boundaries, i.e. image feature boundaries on a small subset of the video image, i.e. in the blocks at the border between the first and second group of connected blocks of pixels. This is an efficient strategy resulting in efficient computing resource usage, since the detailed pixel-based segmentation process is only applied to the blocks at the boundaries and not to all blocks. The block-based motion segmentation and the pixel-based segmentation are applied sequentially: No complex weighting factors are required to tune between the results of the segmentation approaches as in the prior art.

In an embodiment of the method according to the invention, segmenting the first video image into the first group of connected blocks of pixels and the second group of connected blocks of pixels is based on a motion model. The advantage of this embodiment is that it is a robust method. Relatively much data, i.e. most or all motion vectors of test groups of connected blocks for the first group of connected blocks of pixels are applied to estimate the appropriate configuration of blocks which belong to the first image feature. In other words it is a type of region fitting. Many segmentation methods only take blocks at the border of a segment into account to decide whether the blocks correspond to the particular segment or not. The motion model might be based on rotation and/or translation. However preferably the segmenting is based on an affine motion model.

In an embodiment of the method according to the invention, segmenting the first video image into the first group of connected blocks of pixels and the second group of connected blocks of pixels comprises:
- creating a first initial group of connected blocks of pixels for the first group of connected blocks of pixels, the first initial group of connected blocks of pixels comprising a particular block of pixels;
- determining a first motion model for the first initial group of connected block of pixels;
- calculating a first match error between the motion vector corresponding to the particular block of pixels being estimated during estimating motion vectors for the respective blocks of pixels of the first video image and the motion vector corresponding to the particular block of pixels on basis of the first motion model;
- calculating a second motion model for a test group of connected blocks of pixels, based on the first initial group of connected blocks of pixels, but excluding the particular block of pixels;
- calculating a second match error between the motion vector corresponding to the particular block of pixels being estimated during estimating motion vectors for the respective blocks of pixels of the first video image and the motion vector corresponding to the particular block of pixels on basis of the second motion model;
- deciding whether the particular block of pixels corresponds to the first group of connected blocks of pixels or not on basis of the first and second match error.

An advantage of this embodiment according to the invention is that it allows for a scanning approach. That means that block by block, e.g. starting at the left top towards the right bottom each block is tested iterative. Testing means that for each block it is evaluated to with which other blocks it should be merged to eventually form the group of blocks corresponding to one of the image features. The advantage of the scanning approach is that the method can be implemented relatively easy.

In an embodiment of the method according to the invention the pixel-based segmentation is based on a spatial color model. In other words the image property on which the pixel-based segmentation is based, is color. Color is a relatively good cue for segmentation. In this embodiment the two segmentation approaches are applied on the appropriate scale resolution: color is applied for high frequencies and motion segmentation for low frequencies. Since color differences are caused by texture and motion differences caused by different velocities of objects in the scene being captured.

In an embodiment of the method according to the invention the pixel-based segmentation is based on a spatial luminance model. In other words the image property on which the pixel-based segmentation is based, is luminance. Luminance is a relatively good cue for segmentation.

In an embodiment of the method according to the invention a step in values of the image property is detected in a first block of the portion of the blocks of pixels of the first group of connected blocks of pixels, which have been determined to be positioned at the border between the first and second group of connected blocks of pixels. A step in values corresponds to the edge of the first image feature. Preferably the step is detected by means of:

calculating for the pixels of the first block a first mean value of the image property;
  calculating a first difference measure on basis of the first mean value and the respective values of the pixels of the first block;
  calculating for the pixels of a second block of pixels a second mean value of the image property, the second block of pixels corresponding to the second group of pixels and being connected to the first block;
  calculating a second difference measure on basis of the second mean value and the respective values of the pixels of the second block;
  creating a first test group of pixels on basis of the first block but excluding a particular pixel and creating a second test group of pixels on basis of the second block and comprising the particular pixel;
  calculating for the pixels of the first test group a third mean value of the image property;
  calculating a third difference measure on basis of the third mean value and the respective values of the pixels of the first test group;
  calculating for the pixels of the second test group a fourth mean value of the image property;
  calculating a fourth difference measure on basis of the fourth mean value and the respective values of the pixels of the second test group;
  deciding whether the particular pixel belongs to the first image feature or the second image feature on basis of the first, second, third and fourth difference measure. The advantage of this embodiment is that it is a robust method. Relatively much data, i.e. most or all pixels of the first and second block of pixels are applied to estimate the appropriate configuration of pixels which belong to the first image feature. This is a so-called region fitting approach.

It is another object of the invention to provide a segmentation system of the kind described in the opening paragraph which is arranged to provide pixel accurate segmentations and which is relatively easy.

This object of the invention is achieved in that the segmentation system for segmenting a first image feature in a first video image from an adjacent second image feature in the first video image, the first image feature having plural pixels with respective values of an image property substantially being in a first range of values and having motion relative to the second image feature between the first video image and a second video image, and the second image feature having plural pixels with respective values of the image property substantially being in a second range of values being different from the first range of values, comprises;

dividing means for dividing the first video image into blocks of pixels;
  a block-based motion estimator for estimating motion vectors for the respective blocks of pixels;
  a motion segmentation unit for segmenting the first video image into a first group of connected blocks of pixels and a second group of connected blocks of pixels by classifying the blocks of pixels on basis of the motion vectors of the respective blocks of pixels; and
  a pixel-based segmentation unit for segmenting the first image feature from the second image feature by means of a pixel-based segmentation of a portion of the blocks of pixels of the first and second group of connected blocks of pixels, which have been determined to be positioned at a border between the first and second group of connected blocks of pixels, on basis of the respective values of the image property.

It is another object of the invention to provide a motion estimator at pixel resolution for estimating a pixel accurate motion vector field, which is relatively easy.

This object of the invention is achieved in that the pixel accurate motion estimator comprises the segmentation system as claimed in claim 9. Alternatively, the pixel accurate motion estimator is provided with results being calculated by the segmentation system.

It is advantageous to apply an embodiment of the pixel accurate motion estimator according to the invention in an image processing apparatus as described in the opening paragraph. The image processing apparatus may comprise additional components, e.g. a display device for displaying the processed images or storage means for storage of the processed images. The motion compensated image processing unit might support one or more of the following types of image processing:

De-interlacing: Interlacing is the common video broadcast procedure for transmitting the odd or even numbered image lines alternately. De-interlacing attempts to restore the full vertical resolution, i.e. make odd and even lines available simultaneously for each image;
  Up-conversion: From a series of original input images a larger series of output images is calculated. Output images are temporally located between two original input images;
  Temporal noise reduction. This can also involve spatial processing, resulting in spatial-temporal noise reduction; and
  Video compression, i.e. encoding or decoding, e.g. according to the MPEG standard or H26L standard.

Modifications of the method and variations thereof may correspond to modifications and variations thereof of the segmentation system, the pixel accurate motion estimator and of the image processing apparatus described.

Figure 2A:
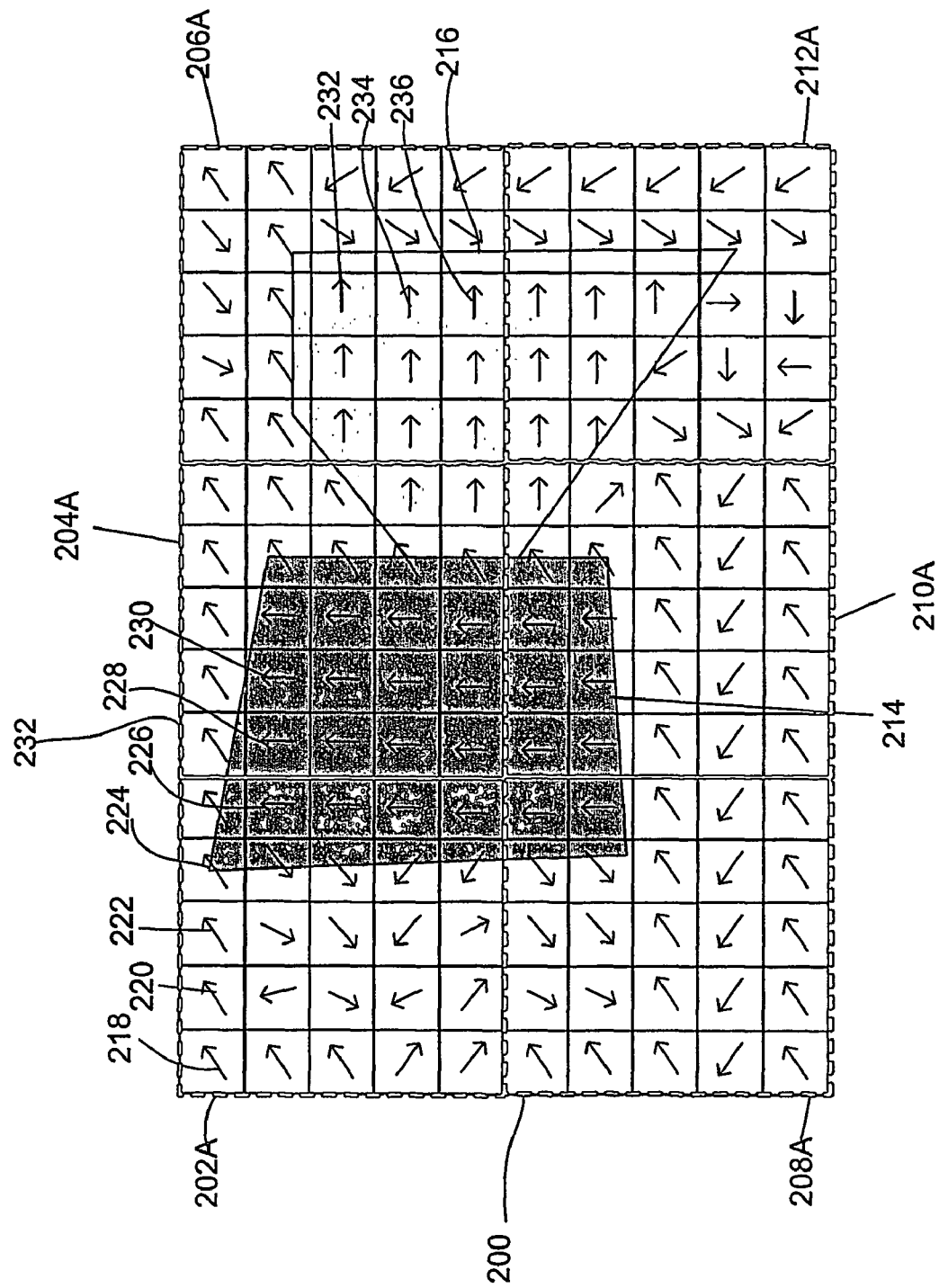
Figure 2B:
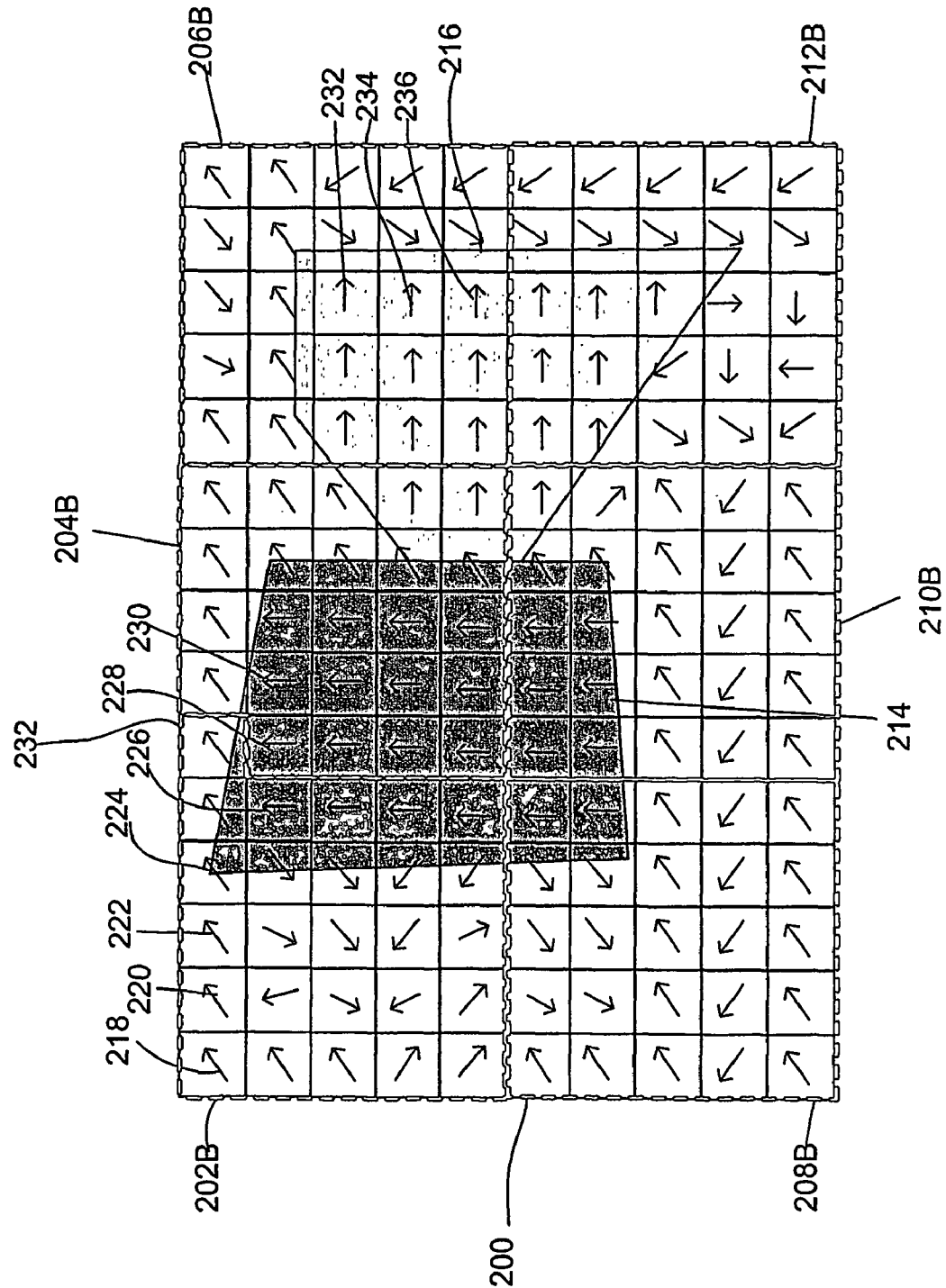
Figure 3A:
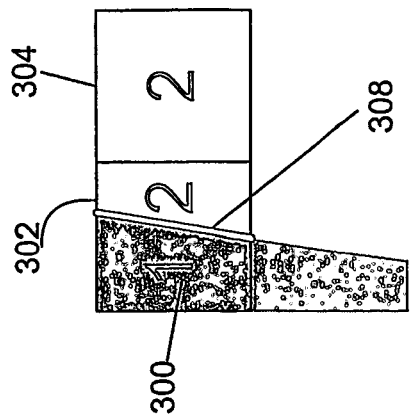
Figure 3B:
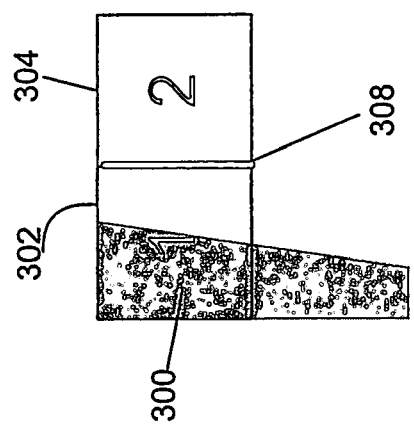
Figure 3C:
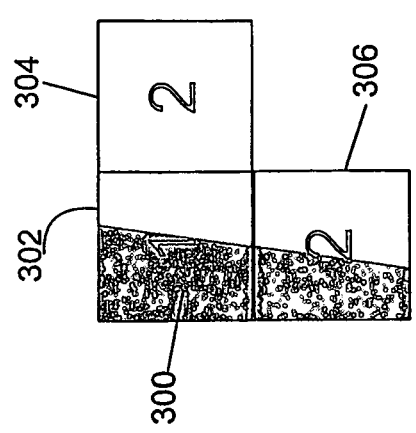
Figure 3D:
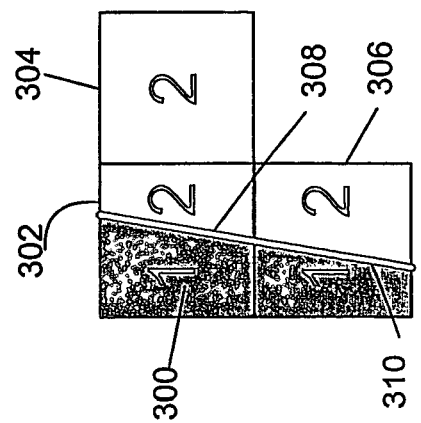
Figure 3E:
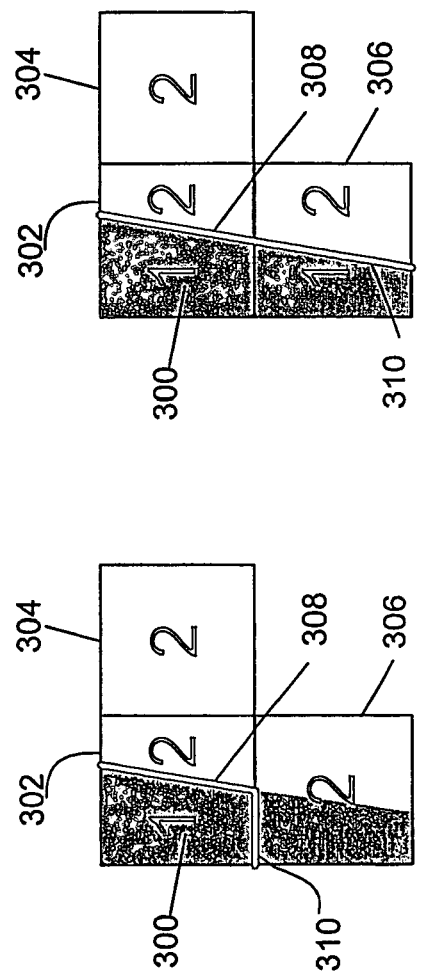
Figure 4A:
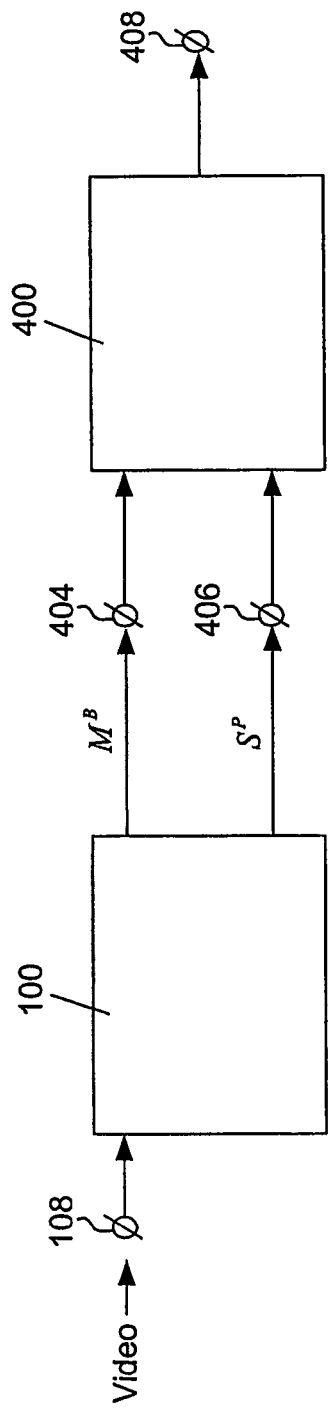
Figure 4B:
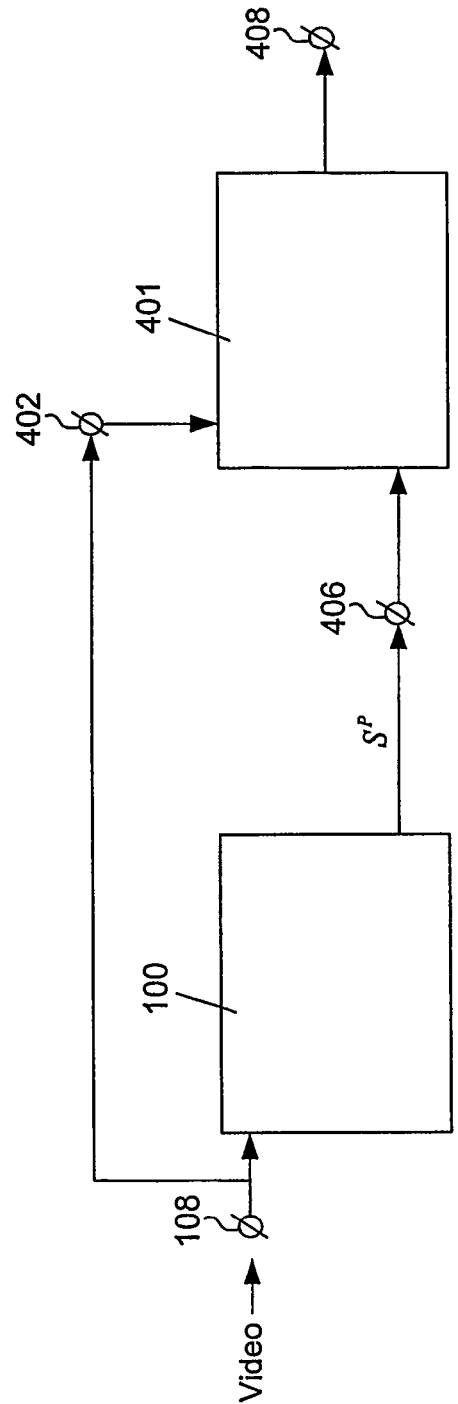
Figure 5:
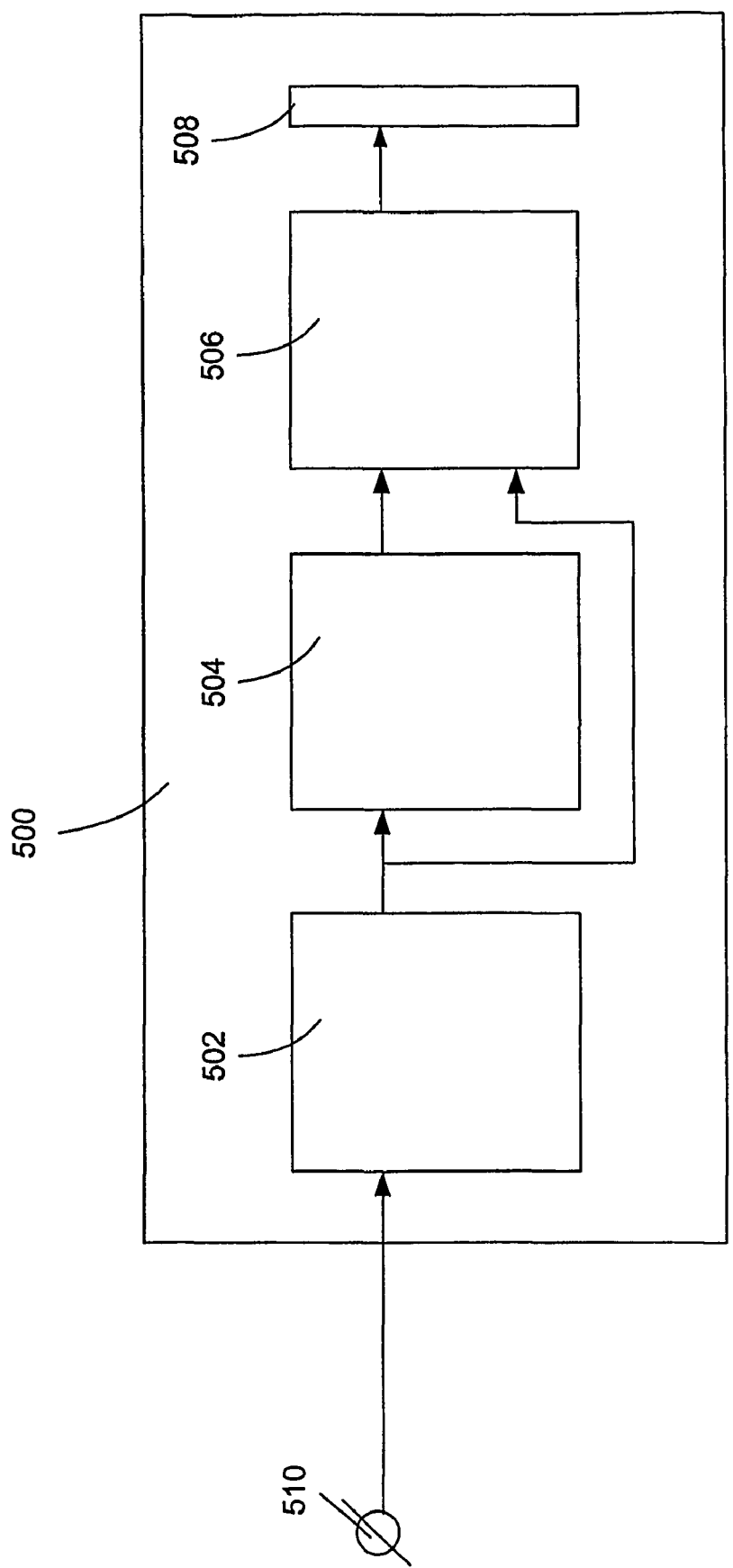

These and other aspects of the method, the segmentation system, the pixel accurate motion estimator and of the image processing apparatus according to the invention will become apparent from and will be elucidated with respect to the implementations and embodiments described hereinafter and with reference to the accompanying drawings, wherein:

FIG. 1 schematically shows an embodiment of the segmentation system according to the invention;

FIG. 2A schematically shows an initial configuration of blocks for the block-based motion segmentation;

FIG. 2B schematically shows an updated configuration of blocks of FIG. 2A after one modification;

FIG. 2C schematically shows a result configuration of blocks of the block-based motion segmentation;

FIG. 3A schematically shows input blocks for the pixel-based segmentation;

FIG. 3B schematically shows an initial edge for a horizontal block pair for the pixel-based segmentation;

FIG. 3C schematically shows the detected edge for the horizontal block pair of FIG. 3B;

FIG. 3D schematically shows an initial edge for a vertical block pair for the pixel-based segmentation;

FIG. 3E schematically shows the finally detected edge;

FIG. 4A schematically shows the inputs and output of a motion estimator for estimating a pixel accurate motion vector field;

FIG. 4B schematically shows the inputs and output of an alternative motion estimator for estimating a pixel accurate motion vector field; and FIG. 5 schematically shows elements of an image processing apparatus according to the invention.

Same reference numerals are used to denote similar parts throughout the figures.

FIG. 1 schematically shows an embodiment of the segmentation system 100 according to the invention. The segmentation system 100 is arranged to segment a first image feature 214 in a first video image from an adjacent second image feature 216 in the first video image. The first image feature 214 has plural pixels with respective color values substantially being in a first range of values and the second image feature 216 has plural pixels with respective color values substantially being in a second range of values being different from the first range of values. The first image feature 214 has motion relative to the second image feature 216 between the first video image and a second video image. The second video image might be succeeding or preceding the first video image. The segmentation system 100 receives a signal representing video images at the input connector 108 and provides a pixel accurate segmentation result $S^P$ at the output connector 110. The segmentation system 100 comprises;

a block-based motion estimator 102 for estimating motion vectors. This motion estimator 102 is arranged to estimate motion vectors 218-230 for the respective blocks in which the first video image has been divided by the splitting unit 103. This dividing means that the pixels of the first video image are clustered into blocks of pixels. Typically a block of pixels comprises 8*8 pixels. Preferably the motion estimator 102 is as described in the article "True-Motion Estimation with 3-D Recursive Search Block Matching" by G. de Haan et. al. in IEEE Transactions on circuits and systems for video technology, vol.3, no.5, October 1993, pages 368-379. The motion estimator 102 provides a block-based motion vector field $M^B$ to;

a motion segmentation unit 104 which is arranged to segment the first video image into a first group of connected blocks of pixels 204C (see FIG. 2C) and a second group of connected blocks of pixels 206C (see FIG. 2C) by classifying the blocks of pixels on basis of the motion vectors 218-230 of the respective blocks of pixels. The segmentation unit 104 provides a block-based segmentation result $S^B$ to;

a pixel-based segmentation unit 106 which is arranged to segment the first image feature 214 from the second image feature 216 by means of a pixel-based segmentation of a portion of the blocks 302-306 of pixels of the first and second group of connected blocks of pixels 204, 206, which have been determined to be positioned at a border between the first and second group of connected blocks of pixels 204, 206. The pixel-based segmentation unit 106 is designed to perform the segmentation on basis of color values of pixels.

The behavior of the motion segmentation unit 104 will be described in more detail in connection with FIGS. 2A-2C and the behavior of the pixel-based segmentation unit 106 will be described in more detail in connection with FIGS. 3A-3E.

The block-based motion estimator 102, the motion segmentation unit 104 and the pixel-based segmentation unit 106 of the segmentation system 100 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Alternatively an application specific integrated circuit provides the disclosed functionality.

In FIG. 2A a motion vector field 200 is depicted. The motion vector field 200 comprises a number of motion vectors 218-230 for the respective blocks of pixels. These blocks of pixels have been clustered into 6 initial groups of connected blocks of pixels 202A-212A. Or in other words, FIG. 2A schematically shows an initial configuration of blocks for the block-based motion segmentation. The number of initial groups of connected blocks corresponds to the maximum number of image features, i.e. objects which one want to segment in the video image. In this exemplary cases each initial group of connected blocks of pixels 202A-212A comprises 5*5 blocks. All blocks of pixels of a particular initial group of connected blocks have the same classification label. By means of a scanning approach all blocks will be evaluated. That means that appropriate clusters or groups of connected blocks of pixels 202C-206C (See FIG. 2C) are determined. Such a group of connected blocks of pixels 202C-206C corresponds to one of the image features 214, 216 in the first video image. Finding the appropriate groups is achieved in a number of iterations wherein for the blocks is tested to which group of connected blocks of pixels 202-206C it belongs to. That might be in a fixed number of iterations. Alternatively the process of evaluating the various intermediate groups of connected blocks 202B-212B is stopped if modifications of intermediate groups of connected blocks 202B-212B do not have any positive effect. The process of evaluating is bounded by a topological constraint. Only blocks at the border of a connected groups of blocks 202A-212A, 202B-212B are tested. Notice that a block might become located at the border of an intermediate group of blocks 202B-212B after a number of iterations. Only applying blocks at the border is different from the well-known k-means approach which does not have this constraint. The evaluation of a particular block of pixels 232 comprises a number of steps. This is described for the particular block of pixels 232 during the first scan (See FIG. 2A):

creating a first initial group of connected blocks of pixels 204A comprising the particular block of pixels 232.

determining a first motion model for the first initial group of connected block of pixels 204A;

calculating a first match error between the motion vector corresponding to the particular block of pixels 232 being estimated during estimating motion vectors for the respective blocks of pixels of the first video image and the motion vector corresponding to the particular block of pixels 232 on basis of the first motion model. Preferably the match error is based on the Euclidean distance between the motion vectors;

calculating a second motion model for a test group of connected blocks of pixels 204B, based on the first initial group of connected blocks of pixels 204A, but excluding the particular block of pixels 232. (See 204B in FIG. 2B);

calculating a second match error between the motion vector corresponding to the particular block of pixels 232 being estimated during estimating motion vectors for the respective blocks of pixels of the first video image and the motion vector corresponding to the particular block of pixels 232 on basis of the second motion model;

deciding whether the particular block of pixels 232 corresponds to the first group of connected blocks of pixels 204C or not on basis of the first and second match error. This means that it is tested whether the particular block of pixels 232 matches better with the first initial group of connected blocks of pixels 204A or with the neighboring group of connected block of pixels 202A. In this case it appeared that the particular block of pixels 232 better matches with the latter group of blocks 202A and hence the neighboring group of connected blocks of pixels 202A is extended with the particular block 232 resulting in the intermediate group of blocks 202B. The first initial group of blocks 204A is adapted into an intermediate group of blocks 204B excluding the particular block 232 (See FIG. 2B).

Alternatively, additional match errors are calculated and taken into account to decide to which of the initial groups of blocks 202A-212A the particular block of pixels 232 belongs to. E.g. a third match error is calculated for a second initial group of connected blocks of pixels 202A as depicted in FIG. 2A and a fourth match error for a second test group of connected blocks of pixels 202B as depicted in FIG. 2B.

The test whether the particular block of pixels 232 matches better with the first initial group of connected blocks of pixels 204A or with the neighboring group of connected block of pixels 202A can also be performed by means of evaluating with the first initial group of connected blocks of pixels 204A and with the neighboring group of connected block of pixels 202A. That means without adapting these groups by moving the particular group of pixels 232 from the first initial group of connected blocks of pixels 204A to the neighboring group of connected block of pixels 202A. In that case motion models are calculated for both groups of connected blocks.

FIG. 2B schematically shows an updated configuration of blocks for the block-based motion segmentation after one modification. This modification can be executed directly or after all relevant blocks of the motion vector field have been evaluated. With relevant is meant that the blocks are positioned at the border of a group of connected blocks of pixels.

It is shown that a particular block of pixels 232 is moved from a first initial group of connected blocks of pixels 204A to a horizontally positioned neighboring group of blocks 202A. However a movement in vertical direction is also possible, e.g. a movement of another block of pixels from the first initial group of blocks 204A to the group of blocks of pixels 210A beneath.

After a number of iterations a number of final groups of blocks of pixels 202C-206C is found. These final groups of blocks of pixels 202C-206C are the output of the block-based motion segmentation. FIG. 2C schematically shows this output, i.e. the result configuration of the block-based motion segmentation. This output is provided to the pixel-based segmentation unit 106 for further processing: detecting the actual borders of the first image feature 214 and the second image feature 216.

Preferably the block-based motion segmentation result for one image pair, e.g. the first image and the second image is applied for initialization of the block-based motion segmentation of a succeeding image pair.

FIG. 3A schematically shows input blocks 302-306 for the pixel-based segmentation. The motion segmentation result indicates that one of the blocks belongs to a first image video feature 214 and is labeled as such 1 and that two of the blocks 304 and 306 belong to a second image video feature 216 and are labeled as such 2. Pairs of neighboring blocks are evaluated to find the actual edge of the first image feature 214.

FIG. 3B schematically shows an initial edge 308 for a horizontal pair of neighboring blocks 302 and 304. In a similar way as described above for the block-based motion segmentation the pixel-based segmentation is performed: with similar is meant that for pixels is evaluated to which group of connected pixels they correspond. This is done on basis of a spatial color model which is based on the following assumptions: Comprised by the pair of neighboring blocks 302 and 304 there is a first group of connected pixels with color values substantially being in a first range of values and a second group of pixels with color values substantially being in a second range of values. Besides that there is a transition or step in color values between the first group of connected pixels and the second group of connected pixels. That means that for pixels of the pair of neighboring blocks 302 and 304 is evaluated to which of the two groups of connected pixels the respective pixels correspond. The evaluation is done by means of an iterative process. That might be in a fixed number of iterations. Alternatively the process of evaluating the various intermediate groups of connected pixels is stopped if modifications of intermediate groups of connected pixels do not have any positive effect. The evaluation for a particular pixel comprises the following steps:

calculating for the pixels of the first block of pixels 302 of the pair of neighboring blocks 302, 304 a first mean color value;

calculating a first difference measure on basis of the first mean color value and the respective values of the pixels of the first block 302;

calculating for the pixels of the second block of pixels 304 of the pair of neighboring blocks 302, 304 a second mean color value;

calculating a second difference measure on basis of the second mean color value and the respective values of the pixels of the second block of pixels 304;

creating a first test group of pixels on basis of the first block 302 but excluding the particular pixel and creating a second test group of pixels on basis of the second block 304 and comprising the particular pixel;

calculating for the pixels of the first test group a third mean color value;

calculating a third difference measure on basis of the third mean color value and the respective values of the pixels of the first test group;

calculating for the pixels of the second test group a fourth mean color value;

calculating a fourth difference measure on basis of the fourth mean color value and the respective values of the pixels of the second test group;

deciding whether the particular pixel belongs to the first group of connected pixels or the second group of connected pixels, on basis of the first, second, third and fourth difference measure.

After a number of iterations the eventual first group of pixels comprises pixels which correspond to the first image feature and the eventual second group of pixels comprises pixels which correspond to the second image feature. FIG. 3C schematically shows the detected edge 308 for the horizontal block pair of FIG. 3B.

After the evaluation of the horizontally positioned pair of neighboring blocks 302, 304 has been completed a similar evaluation is started for a vertically positioned pair of neighboring blocks 302, 306. FIG. 3D schematically shows an initial edge 310 for this vertically positioned pair of neighboring blocks 302, 306. FIG. 3E schematically shows the finally detected edge 310. Notice that the evaluation of the horizontally positioned pair of neighboring blocks 302, 304 and the vertically positioned pair of neighboring blocks 302, 306 might be performed simultaneously.

Although only color is discussed, it should be noted that other image properties can be applied for the pixel-based segmentation, e.g. luminance, or a combination of color and luminance or derived properties such as differences in color/luminance values between neighboring pixels.

FIG. 4A schematically shows the input and outputs of a motion estimator 400 for estimating a pixel accurate motion vector field. A motion vector field $M^B$ as being calculated by the block-based motion estimator 102 as described in connection with FIG. 1 is provided at input connector 404. Optionally the motion models as being calculated by the motion segmentation unit 104 are also provided. Because of the block resolution of the motion vector field $M^B$ the motion vectors 218-230 are not correct for all pixels of the first video image. However at another input connector 406 of the motion estimator 400 also a pixel accurate segmentation result $S^P$ is provided by the segmentation system 100 as described in connection with FIG. 1. By means of combining the information which is provided a pixel accurate motion vector field can be determined. Especially pixels of blocks being located at the borders of the image features 214, 216 might be erroneous. Preferably motion vectors are assigned to these respective pixels which correspond to motion vectors being estimated for neighboring blocks. The selection of the appropriate neighboring block and thus motion vector is determined by the segmentation result $S^P$. In general, to a portion of the pixels of a block being located at the border of an image feature 214, 216 a motion vector is assigned which is equal to a motion vector of a block corresponding to a first image feature 214 and another to another portion of pixels another motion vector is assigned which is equal to a motion vector of a block corresponding to a second image feature 216 being adjacent to the first image feature 214.

FIG. 4B schematically shows the inputs and output of an alternative motion estimator 401 for estimating a pixel accurate motion vector field. Video images are provided at the input connector 402 and at another input connector 406 of the motion estimator 401 also a pixel accurate segmentation result $S^P$ is provided by the segmentation system 100 as described in connection with FIG. 1. The pixel accurate motion estimator 401 is arranged to calculate motion vectors for the groups of pixels corresponding to the respective image features 214, 216 as segmented by the segmentation system 100 by means of comparing the pixels of these groups of pixels with corresponding pixels of preceding or succeeding video images. Preferably the comparing is based on match errors corresponding to the sum of absolute pixel value differences.

FIG. 5 schematically shows elements of an image processing apparatus 500 according to the invention. The image processing apparatus 500 comprises:

a receiving unit 502 for receiving a signal representing video images to be displayed after some processing has been performed. The signal may be a broadcast signal received via an antenna or cable but may also be a signal from a storage device like a VCR (Video Cassette Recorder) or Digital Versatile Disk (DVD). The signal is provided at the input connector 510.

a processing unit 504 comprising a segmentation system 100 and a motion estimator 401 as described in connection with FIG. 1 and FIG. 4A, respectively;

a motion compensated image processing unit 506; and a display device 508 for displaying the processed images. This display device 508 is optional.

The motion compensated image processing unit 506 requires images and motion vectors as its input. The motion compensated image processing unit 506 might support one or more of the following types of image processing: de-interlacing; up-conversion; temporal noise reduction; and video compression.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. A method of segmenting a first image feature (214) in a first video image from an adjacent second image feature (216) in the first video image, the first image feature (214) having plural pixels with respective values of an image property substantially being in a first range of values and having motion relative to the second image feature (216) between the first video image and the second video image, and the second image feature (216) having plural pixels with respective values of the image property substantially being in a second range of values being different from the first range of values, the method comprising;

dividing the first video image into blocks of pixels;

estimating motion vectors (218-230) for the respective blocks of pixels;

segmenting the first video image into a first group of connected blocks of pixels (204C) and a second group of connected blocks of pixels (206C) by classifying the blocks of pixels on basis of the motion vectors (218-230) of the respective blocks of pixels; and succeeded by segmenting the first image feature (214C) from the second image feature (216C) by means of a pixel-based segmentation of a portion of the blocks of pixels of the first and second group of connected blocks of pixels (204C, 206C), which have been determined to be positioned at a border between the first and second group of connected blocks of pixels (204C, 206C), on basis of the respective values of the image property.

2. A method as claimed in claim 1, whereby segmenting the first video image into the first group of connected blocks of pixels (204C) and the second group of connected blocks of pixels (206C) is based on a motion model.

3. A method as claimed in claim 2, whereby segmenting the first video image into the first group of connected blocks of pixels (204C) and the second group of connected blocks of pixels (206C) is based on an affine motion model.

4. A method as claimed in claim 2, whereby segmenting the first video image into the first group of connected blocks of pixels (204C) and the second group of connected blocks of pixels (206C) comprises:
  creating a first initial group of connected blocks of pixels (204A) for the first group of connected blocks of pixels (204C), the first initial group of connected blocks of pixels (204A) comprising a particular block of pixels (232);
  determining a first motion model for the first initial group of connected block of pixels (204A);
  calculating a first match error between the motion vector corresponding to the particular block of pixels (232) being estimated during estimating motion vectors (218-230) for the respective blocks of pixels of the first video image and the motion vector corresponding to the particular block of pixels (232) on basis of the first motion model;
  calculating a second motion model for a test group of connected blocks of pixels (204B), based on the first initial group of connected blocks of pixels (204A), but excluding the particular block of pixels (232);
  calculating a second match error between the motion vector corresponding to the particular block of pixels (232) being estimated during estimating motion vectors (218-230) for the respective blocks of pixels of the first video image and the motion vector corresponding to the particular block of pixels (232) on basis of the second motion model;
  deciding whether the particular block of pixels (232) corresponds to the first group of connected blocks of pixels (204C) or not on basis of the first and second match error.

5. A method as claimed in claim 1, whereby the pixel-based segmentation is based on a spatial color model.

6. A method as claimed in claim 5, whereby a step in values of the image property is detected in a first block (302) of the portion of the blocks of pixels of the first group of connected blocks of pixels (204C), which have been determined to be positioned at the border between the first and second group of connected blocks of pixels (204C, 206C).

7. A method as claimed in claim 6, whereby the step is detected by means of:
  calculating for the pixels of the first block (302) a first mean value of the image property;
  calculating a first difference measure on basis of the first mean value and the respective values of the pixels of the first block (302);
  calculating for the pixels of a second block of pixels (304) a second mean value of the image property, the second block (304) of pixels corresponding to the second qroup of pixels and being connected to the first block (302);
  calculating a second difference measure on basis of the second mean value and the respective values of the pixels of the second block (304);
  creating a first test group of pixels on basis of the first block (302) but excluding a particular pixel and creating a second test group of pixels on basis of the second block (304) and comprising the particular pixel;
  calculating for the pixels of the first test group a third mean value of the image property;
  calculating a third difference measure on basis of the third mean value and the respective values of the pixels of the first test group;
  calculating for the pixels of the second test group a fourth mean value of the image property;
  calculating a fourth difference measure on basis of the fourth mean value and the respective values of the pixels of the second test group;
  deciding whether the particular pixel belongs to the first image feature (214) or the second image feature (216) on basis of the first, second, third and fourth difference measure.

8. A method as claimed in claim 1, whereby the pixel-based segmentation is based on a spatial luminance model.

9. A segmentation system (100) for seqmenting a first image feature (214) in a first video image from an adjacent second image feature (216) in the first video image, the first image feature (214) having plural pixels with respective values of an image property substantially being in a first range of values and having motion relative to the second image feature (216) between the first video image and the second video image, and the second image feature (216) having plural pixels with respective values of the image property substantially being in a second range of values being different from the first range of values, the segmentation system (100) comprising;
  dividing means (103) for dividing the first video image into blocks of pixels;
  a block-based motion estimator (102) for estimating motion vectors (218-230) for the respective blocks of pixels;
  a motion segmentation unit (104) for segmenting the first video image into a first group of connected blocks of pixels (204C) and a second group of connected blocks of pixels (206) by classifying the blocks of pixels on basis of the motion vectors (218-230) of the respective blocks of pixels; and
  a pixel-based segmentation unit (106) for segmenting the first image feature (214) from the second image feature (216) by means of a pixel-based segmentation of a portion of the blocks of pixels of the first and second groin nf connected blocks of pixels (204C, 206C), which have been determined to be positioned at a border between the first and second group of connected blocks of pixels (204C, 206C), on basis of the respective values of the image property.

10. A motion estimator at pixel resolution (400, 401) for estimating a motion vector field, comprising the segmentation system (100) as claimed in claim 9.

11. A motion estimator at pixel resolution (400) as claimed in claim 10 being arranged to assign the motion vectors (218-230) estimated for the respective blocks to the respective pixels of the first video image on basis of the segmenting the first image feature (214) from the second image feature (216).

12. A motion estimator at pixel resolution (401) as claimed in claim 10 being arranged to estimate a new motion vector for the first image feature (214) by means of comparing pixels of the first image feature (214) with corresponding pixels of the second video image.

13. An image processing apparatus (500) comprising:
- receiving means (502) for receiving a signal representing a series of video images;
- a motion estimator at pixel resolution (504) as claimed in claim 10 for estimating a motion vector field from the video images; and
- a motion compensated image processing unit (506) for determining processed images on basis of the video images and the motion vector field.

14. An image processing apparatus (500) as claimed in claim 13, whereby the motion compensated image processing unit (506) is designed to perform video compression.

15. An image processing apparatus (500) as claimed in claim 13, whereby the motion compensated image processing unit (506) is designed to reduce noise in the series of images.

16. An image processing apparatus (500) as claimed in claim 13, whereby the motion compensated image processing unit (506) is designed to de-interlace the series of images.

17. An image processing apparatus (500) as claimed in claim 13, characterized in that the motion compensated image processing unit (506) is designed to perform an up-conversion.

* * * * *